(12) United States Patent
Walter (10) Patent No.: US 11,024,864 B2
(45) Date of Patent: Jun. 1, 2021

(54) ASSEMBLY DEVICE FOR STACKING A FUEL CELL STACK

(71) Applicants: THYSSENKRUPP SYSTEM ENGINEERING GMBH, Heilbronn (DE); thyssenkrupp AG, Essen (DE)

(72) Inventor: Andreas Walter, Schwanewede (DE)

(73) Assignees: THYSSENKRUPP SYSTEM ENGINEERING GMBH, Heilbronn (DE); THYSSENKRUPP AG, Essen (DE)

( * ) Notice: Subject to any disclaimer, the term of this patent is extended or adjusted under 35 U.S.C. 154(b) by 262 days.

(21) Appl. No.: 16/339,762

(22) PCT Filed: Oct. 12, 2017

(86) PCT No.: PCT/EP2017/076096
§ 371 (c)(1),
(2) Date: Apr. 5, 2019

(87) PCT Pub. No.: WO2018/069461
PCT Pub. Date: Apr. 19, 2018

(65) Prior Publication Data
US 2020/0036026 A1    Jan. 30, 2020

(30) Foreign Application Priority Data
Oct. 14, 2016   (DE) .................... 10 2016 220 173.5

(51) Int. Cl.
*H01M 8/2404* (2016.01)
*H01M 8/2465* (2016.01)
*H01M 8/1004* (2016.01)

(52) U.S. Cl.
CPC ....... *H01M 8/1004* (2013.01); *H01M 8/2404* (2016.02); *H01M 8/2465* (2013.01)

(58) Field of Classification Search
CPC .................................................. H01M 8/2404
See application file for complete search history.

(56) References Cited

U.S. PATENT DOCUMENTS

| 2012/0005885 A1* | 1/2012 | Kwok | H01M 8/2404 |
| | | | 29/760 |
| 2015/0221971 A1* | 8/2015 | Watanabe | H01M 8/0254 |
| | | | 429/514 |
| 2016/0111745 A1 | 4/2016 | Lee | |

FOREIGN PATENT DOCUMENTS

| DE | 10 2015 223 193 A | 2/2017 |
| DE | 10 2016 213 266 A | 3/2017 |

(Continued)

OTHER PUBLICATIONS

English Translation of International Search Report issued in PCT/EP2017/076096, dated Nov. 14, 2017.

*Primary Examiner* — Jonathan Crepeau
(74) *Attorney, Agent, or Firm* — thyssenkrupp North America, LLC (57) ABSTRACT

An assembly device may be employed to vertically stack a fuel cell stack having alternating membrane-electrode units and bipolar plates. The assembly device may include a base plate, a cover plate, and connecting pieces positioned at each of two end faces of the base plate and cover plate. A substantially cuboidal assembly chamber may be defined inside the assembly device by a plurality of vertically oriented locating strips, in order, via the locating strips, to position the membrane-electrode units and bipolar plates relative to one another during stacking. The assembly device may further include a drive for synchronous displacement of the locating strips.

12 Claims, 5 Drawing Sheets

(56) References Cited

FOREIGN PATENT DOCUMENTS

| | | |
|---|---|---|
| JP | 2009 140858 A | 6/2009 |
| JP | 2015207501 A | 11/2015 |
| KR | 10 0837904 B | 6/2008 |
| KR | 10 2009 062 955 A | 6/2009 |
| KR | 10 2009 062 963 A | 6/2009 |
| KR | 10 2011 045 770 A | 5/2011 |
| KR | 10 2013 082 410 A | 7/2013 |
| KR | 101294584 B | 8/2013 |
| KR | 101299630 B | 8/2013 |
| KR | 10-2015-0019271 A | 2/2015 |

\* cited by examiner

ASSEMBLY DEVICE FOR STACKING A FUEL CELL STACK

CROSS REFERENCE TO RELATED APPLICATIONS

This application is a U.S. National Stage Entry of International Patent Application Serial Number PCT/EP2017/076096, filed Oct. 12, 2017, which claims priority to German Patent Application No. DE 10 2016 220 173.5, filed Oct. 14, 2016, the entire contents of both of which are incorporated herein by reference.

FIELD

The present disclosure generally relates to fuel cells, including assembly devices for vertically stacking a fuel cell stack constructed of alternating membrane-electrode units and bipolar plates.

BACKGROUND

A fuel cell stack, or "stack", consists in simple terms of a plurality of fuel cells stacked one on top of the other, an upper cover plate and a lower cover plate. Membrane-electrode units, or MEA for short, and bipolar plates, BPP for short, are stacked alternately between the upper and lower cover plates. The number of stacked fuel cells is dependent on the desired power output of the "stack" and may be of the order of 600 parts, with a structural height of around 680 mm. Devices for assembling fuel cell stacks are disclosed for example in DE 10 2016 213 266 A1 and DE 10 2015 223 193 A1.

Fuel cell stacks may conventionally be produced using two different processes. Thus, on the one hand stacking, pressing and finally tension element fitting may take place in a device, the fuel cell stack then being removed from the device and transported to the remainder of the assembly process. On the other hand, the fuel cell stacks may be stacked in a device and then transferred to a press, which is attached to a manipulator such as for example a robot. The stacks are then transferred inclusive of the press to a device for tension element fitting, after which they are transported to the remainder of the assembly process. A feature common to both processes is that precautions must be taken to hold the individual layers of the fuel cell stack in shape and position during stacking, which must in particular be ensured given that the material sealing the MEA consists of a highly elastic material, which has only extremely low inherent stability. Overall, the outlined processes are not configured in an integrated manner, but rather the various production stations have to be connected together using considerable additional logistical effort. This leads to rather long cycle times.

On this basis, it would be desirable for the production of fuel cell stacks to be able to provide an assembly aid which allows cycle times to be reduced. Furthermore, the assembly aid must be able to hold the fuel cell stacks, which are very unstable due to their structural height and the different materials of the individual parts, in a defined shape and position throughout the entire process. This situation is made worse by the fact that the upper and lower cover plates project laterally beyond the fuel cells, such that specific structural precautions have to be taken to provide lateral locating surfaces for the fuel cell layers which are not impeded by the cover plate. Finally, it must be ensured that, after pressing and prior to tension element fitting, insulating elements may be fitted around the fuel cell stack. It has then to be possible to fit the tension elements. Finally, it would be advantageous for the production process which is to be carried out using the assembly aid to be implementable both in a robot cell and in a conventional transport system.

Thus a need exists for an assembly aid that meets the requirements outlined above.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, an assembly device for vertically stacking a fuel cell stack constructed from alternating membrane-electrode units and bipolar plates may include a base plate, a cover plate, and at least in each case, one connecting piece arranged at each of the two end faces. A substantially cuboidal assembly chamber may be defined inside the assembly device by a plurality of vertically oriented locating strips, in order, via the locating strips, to position the membrane-electrode units and bipolar plates relative to one another during stacking.

With the assembly device according to the invention, an assembly aid is provided which runs through all the steps of the production process while the individual stacked components remain in the assembly device. This means that, first of all, the necessary components, inter alia the MEA, the BPP and the lower and upper cover plates, are stacked in the assembly device, then the stacked components are transported together with the assembly device to the press in order to be pressed therein and provided with the insulating elements and the tension elements, and finally the pressed fuel cell stack is removed from the assembly device and supplied to the remainder of the assembly process. The assembly device, which is now empty, can now be made available for a new production process. The locating strips advantageously ensure that the stacked components remain in position during stacking, since the locating strips remain permanently in contact with the MEA and BPP layers.

In one advantageous configuration of the invention, a drive is provided for synchronous displacement of the locating strips. This advantageously ensures that the assembly chamber may be varied in its dimensions and may be adapted to different geometries of the fuel cell stack to be constructed. In one specific configuration, the locating strips are horizontally displaceable. This is advantageous since the lower cover plate of the fuel cell stack to be produced is larger circumferentially than the fuel cells (consisting of MEA and BPP) to be stacked on the lower cover plate and displacement of the locating strips initially opens up the chamber for insertion of the lower cover plate into the assembly device. The locating strips are then moved back, into a position in which the horizontal distance between the locating strips corresponds exactly to the dimensions of the fuel cells to be stacked. This ensures that during the process of stacking the individual fuel cells, the components (MEA, BPP, seals etc.) are at all times lying against the locating strips and held and positioned securely thereby.

In one advantageous configuration of the invention, the drive in each case comprises transmission mechanisms arranged in the connecting pieces for transmission to the locating strips. This is advantageous since there is sufficient space in the connecting pieces to accommodate the transmission mechanisms therein. Provision may also be made for the transmission mechanisms to extend as far as into the base plate and into the cover plate of the assembly device.

In one advantageous configuration of the invention, the drive has an interface, via which mechanical, electrical, hydraulic or pneumatic drive energy may be introduced. This is advantageous since one of these forms of drive energy is regularly directly available in a production or workshop environment.

In one advantageous configuration of the invention, the locating strips each comprise a vertically stationary first strip portion and a vertically mobile second strip portion. This ensures that the different components of the fuel cell stack may, on pressing of the fuel cell stack, perform a vertical relative motion depending on the vertical arrangement relative to the first and second strip portions. The aligning function of the assembly device may in this way advantageously be ensured during pressing.

In one advantageous configuration of the invention, the mobile strip portions are arranged in an upper region of the locating strip. This is advantageous in that the fuel cells are stacked from the bottom upwards and then pressed from the top downwards, such that the upper region of the fuel cell stack, which travels a greater distance on pressing, does not move relative to the strip portions but rather moves downwards with the mobile upper strip portions.

In one advantageous configuration of the invention, the mobile strip portions are loaded into a vertically upper home position relative to the stationary strip portion via spring means. In this way, the mobile strip portions always adopt a defined position when unloaded. The vertical height of the two strip portions advantageously corresponds substantially to the maximum height of a fuel cell stack to be stacked when the mobile strip portions are in the home position.

In one advantageous configuration of the invention, the locating strips are each arranged on the connecting pieces so as to extend between the base plate and the cover plate. This ensures that the locating strips surround the fuel cell stack to be stacked as uniformly as possible, so as to guarantee the aligning function of the assembly device.

In one advantageous configuration of the invention, one locating strip is arranged on each of the connecting pieces and two locating strips are arranged between the base plate and the cover plate on each flank of the assembly device connecting the connecting pieces. The configuration is advantageous when the connecting pieces are arranged on the narrow side and the flanks are arranged on the long side of the assembly device. In this way, satisfactory alignment of the fuel cells is ensured on all sides during stacking.

In one advantageous configuration of the invention, a vertically adjustable component receptacle for accommodating a fuel cell stack is arranged on the base plate. The vertically adjustable component receptacle ensures that fuel cell stacks of different heights can be produced in the assembly device.

In one advantageous configuration of the invention, a contact plate is provided via which a manipulator, in particular a robot, may be connected for transporting the assembly device. This ensures that the assembly device may run through all the steps of the assembly process, i.e. stacking, pressing, fitting of the insulating and tension elements and the remainder of the assembly process.

Figure 1:
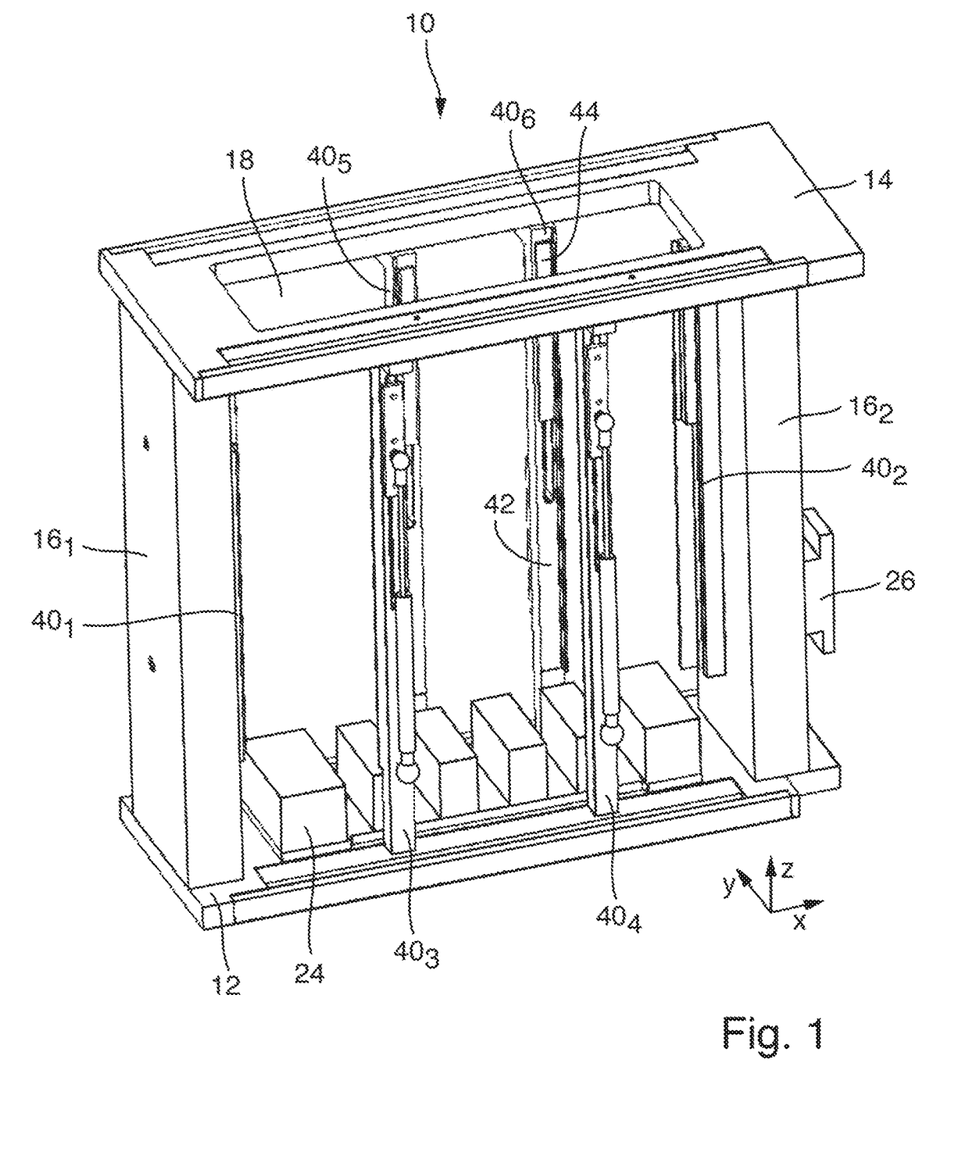
FIG. 1 is a perspective view of an example assembly device.

FIG. 1 shows an assembly device 10 according to the invention, which depicts an assembly aid for the production of fuel cell stacks. The assembly device 10 consists of a base plate 12, a cover plate 14 and connecting pieces $16_1$ and $16_2$ extending on both sides between base plate 12 and cover plate 14. The base plate 12 comprises a component receptacle 24, on which the fuel cell stack to be stacked is accommodated. The component receptacle 24 is vertically adjustable heightwise within the assembly device 10. At least one of the connecting pieces $16_1$, $16_2$ may comprise a contact plate 26, via which the assembly device 10 may be held and moved by a manipulator, not shown, for example a robot. For the purpose of describing directions, a system of rectangular coordinates is shown in FIG. 1, this having an x direction, a y direction and a z direction. On the basis thereof, the z direction denotes the vertical direction and the x direction and the y direction denote horizontal directions.

The assembly device 10 forms within it a substantially cuboidal assembly chamber 18 for producing a fuel cell stack. The assembly chamber 18 may also adopt other shapes. The assembly chamber 18 is defined circumferentially by a plurality of vertically extending locating strips 40. In the present case, a total of six locating strips $40_1$ to $40_6$ is provided, a different number of locating strips also being conceivable. Of the six locating strips $40_1$ to $40_6$, two locating strips $40_1$, $40_2$ are arranged on the respective inner sides of the connecting pieces $16_1$, $16_2$ and in each case two locating strips $40_3$, $40_4$ and $40_5$, $40_6$ are arranged on each flank of the assembly device 10 connecting the connecting pieces $16_1$, $16_2$.

Figure 2:
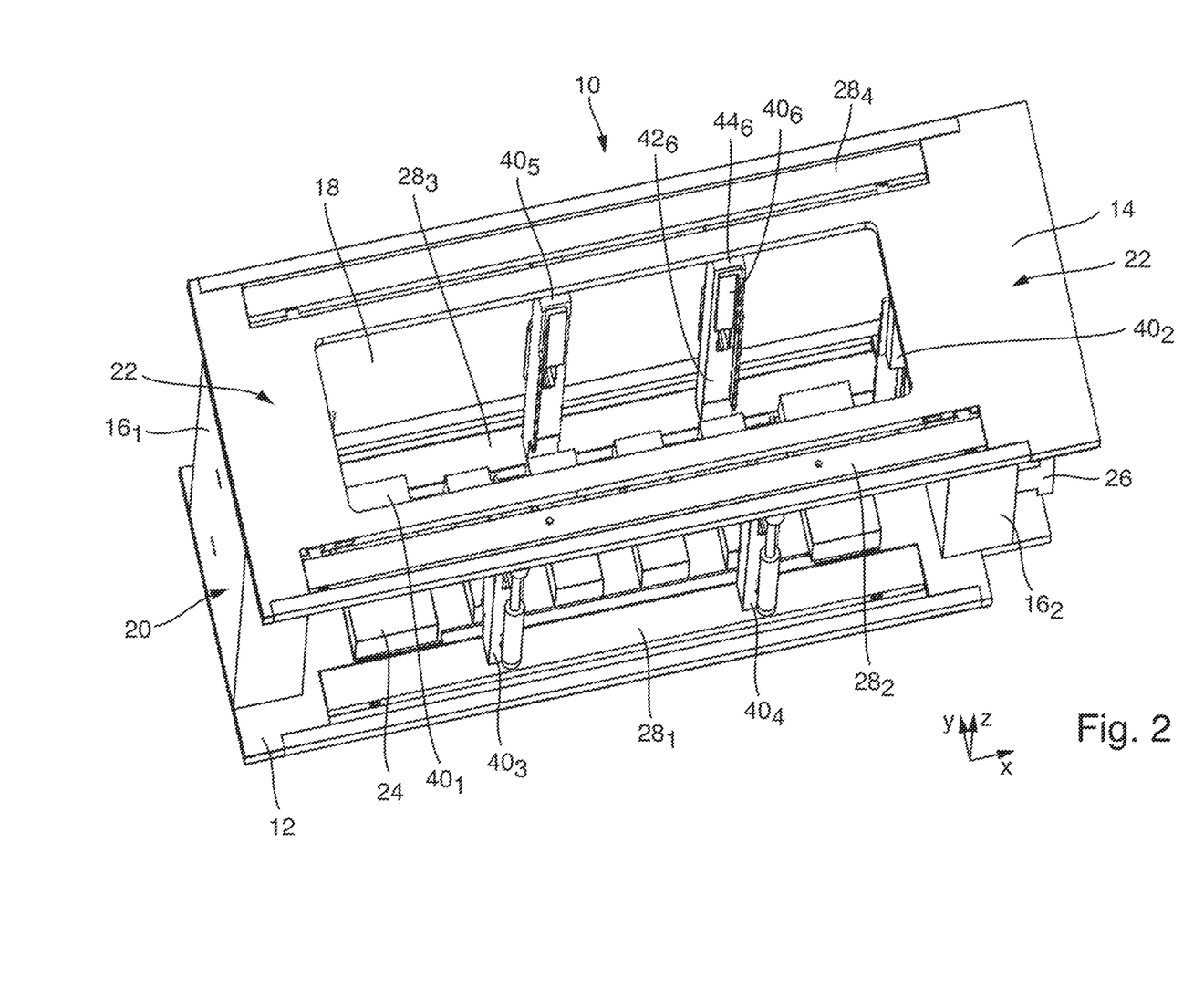
FIG. 2 is another perspective view of the example assembly device according to FIG. 1.
Figure 3:
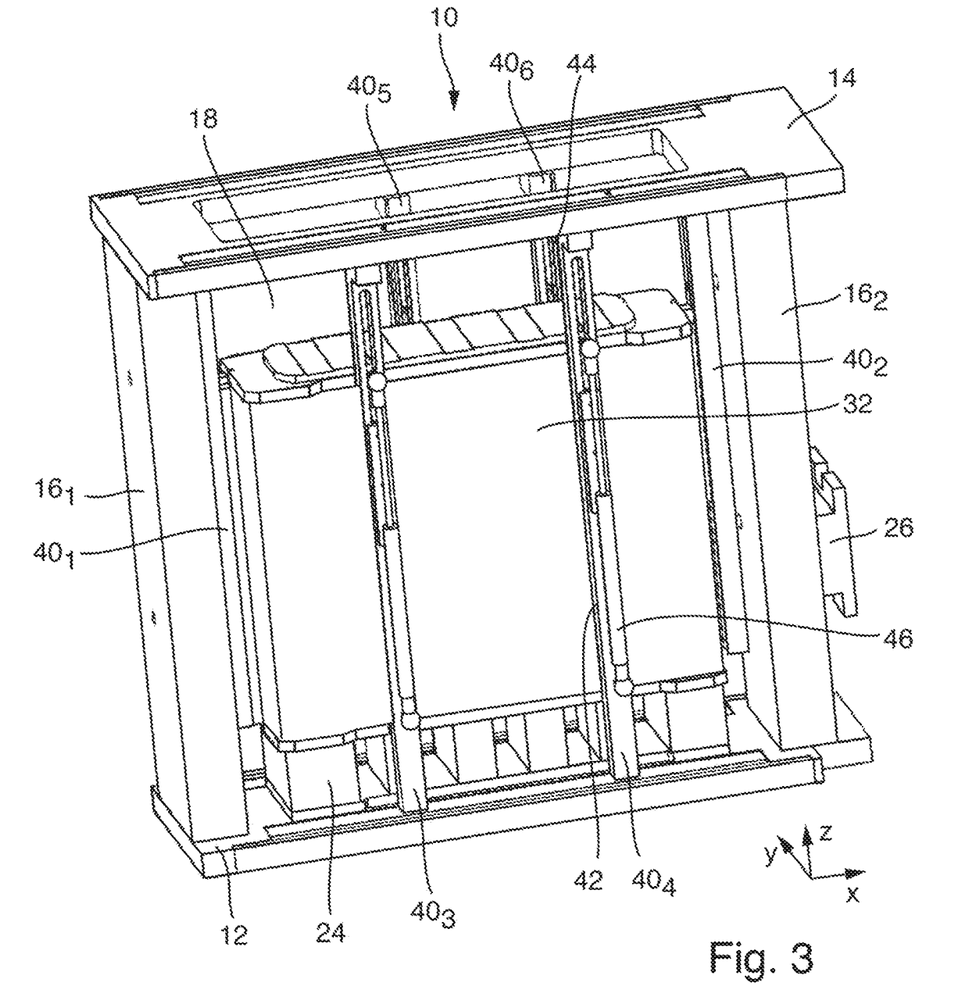
FIG. 3 is a perspective view of the assembly device according to FIG. 1 with an example fuel cell stack.

Referring additionally to FIG. 2, the locating strips $40_1$ to $40_6$ and their function are explained below in a first possible configuration. This first configuration is based on a variant in which no "assembly grooves" are provided in the upper cover plate and the lower cover plate of the fuel cell stack. In contrast, a variant with assembly grooves in the upper cover plate and the lower cover plate of the fuel cell stack is provided, wherein an assembly groove constitutes an indentation disposed at the periphery of the cover plate. In this case, an assembly groove of the lower cover plate is vertically aligned with an assembly groove of the upper cover plate. A plurality of assembly grooves may be provided around the periphery, for example the number thereof may correspond to the number of locating strips of the assembly device.

In the first configuration of the assembly device 10 for the variant of a fuel cell stack without assembly grooves, each of the locating strips $40_1$ to $40_6$ comprises a vertically stationary lower strip portion 42 and a vertically mobile upper strip portion 44. The mobile upper strip portion 44 is loaded into a vertically upper home position via spring means 46, which rest on a base member of the respective locating strip 40. The upper strip portions 44 may be moved vertically downwards against the spring force of the spring means 46.

Furthermore, the locating strips $40_1$ to $40_6$ are horizontally displaceable. Provision is made in particular for the connecting piece-side locating strips $40_1$, $40_2$ to be displaceable in the x direction and for the flank-side locating strips $40_3$ to $40_6$ to be displaceable in the y direction. To displace the locating strips $40_1$ to $40_6$, a drive 20 is provided which comprises transmission mechanisms 22 arranged in the connecting pieces $16_1$, $16_2$ and slide rails $28_1$ to $28_4$ arranged on the flank side in the region of the base plate 12 and cover plate 14. The locating strips $40_3$ to $40_6$ are held on the base plate 12 or the cover plate 14 respectively by way of the slide rails $28_1$ to $28_4$ and may be displaced in the y direction by way of the transmission mechanisms 22. The connecting piece-side locating rails $40_1$, $40_2$ may for example be displaced in the x direction directly by way of the transmission mechanisms 22.

To begin stacking of a fuel cell stack, first of all the locating strips $40_1$ to $40_6$ are displaced outwards in their respective horizontal direction relative to the assembly chamber 18, i.e. assembly chamber 18 is enlarged. Then the lower cover plate of a fuel cell stack to be stacked is inserted onto the component receptacle 24 and into the assembly device 10. For this purpose, the component receptacle 24 is situated in the lower vertical position. The locating strips $40_1$ to $40_6$ are then displaced horizontally inwards again, until they are in lateral contact with the inserted lower cover plate of the fuel cell stack to be stacked. The fuel cell stack is then stacked by alternate stacking of BPP and MEA layers. During stacking, these stacked BPP and MEA layers gradually come into contact with the vertically stationary lower strip portions 42 of the locating strips $40_1$ to $40_6$ and, as the process continues, with the vertically mobile upper strip portions 44. The BPP and MEA layers are uniformly positioned thereby and held in this position as the process continues. The final step of the stacking process consists in placing the upper cover plate of the fuel cell stack. In this case, the upper cover plate of the fuel cell stack comes into contact with the mobile upper strip portions 44 of the locating strips $40_1$ to $40_6$. As described in greater detail further below, this contact between the upper cover plate of the fuel cell stack ensures that, on subsequent pressing of the fuel cell stack, the mobile upper strip portions 44 are displaced downwards over the entire pressing stroke against the spring loading and the aligning function of the upper strip portions 44 and the lower strip portions 42 is retained. A finished stacked fuel cell stack 32 in an assembly device 10 according to the invention is shown in FIG. 4.

In the variant of a fuel cell stack with assembly grooves, a further configuration of the assembly device 10 may be used in which it is possible to dispense with the described horizontal displacement of the locating strips $40_1$ to $40_6$. In this case, it is possible to begin stacking the BPP and MEA layers both in the lower position of the component receptacle 24 and in the upper position thereof. In this configuration of the assembly device 10, it is also possible to dispense with the mobile upper strip portions 44 of the locating strips $40_1$ to $40_6$. If stacking was begun when the component receptacle 24 was in the upper position, it is gradually lowered during stacking of the BPP and MEA layers.

Figure 4:
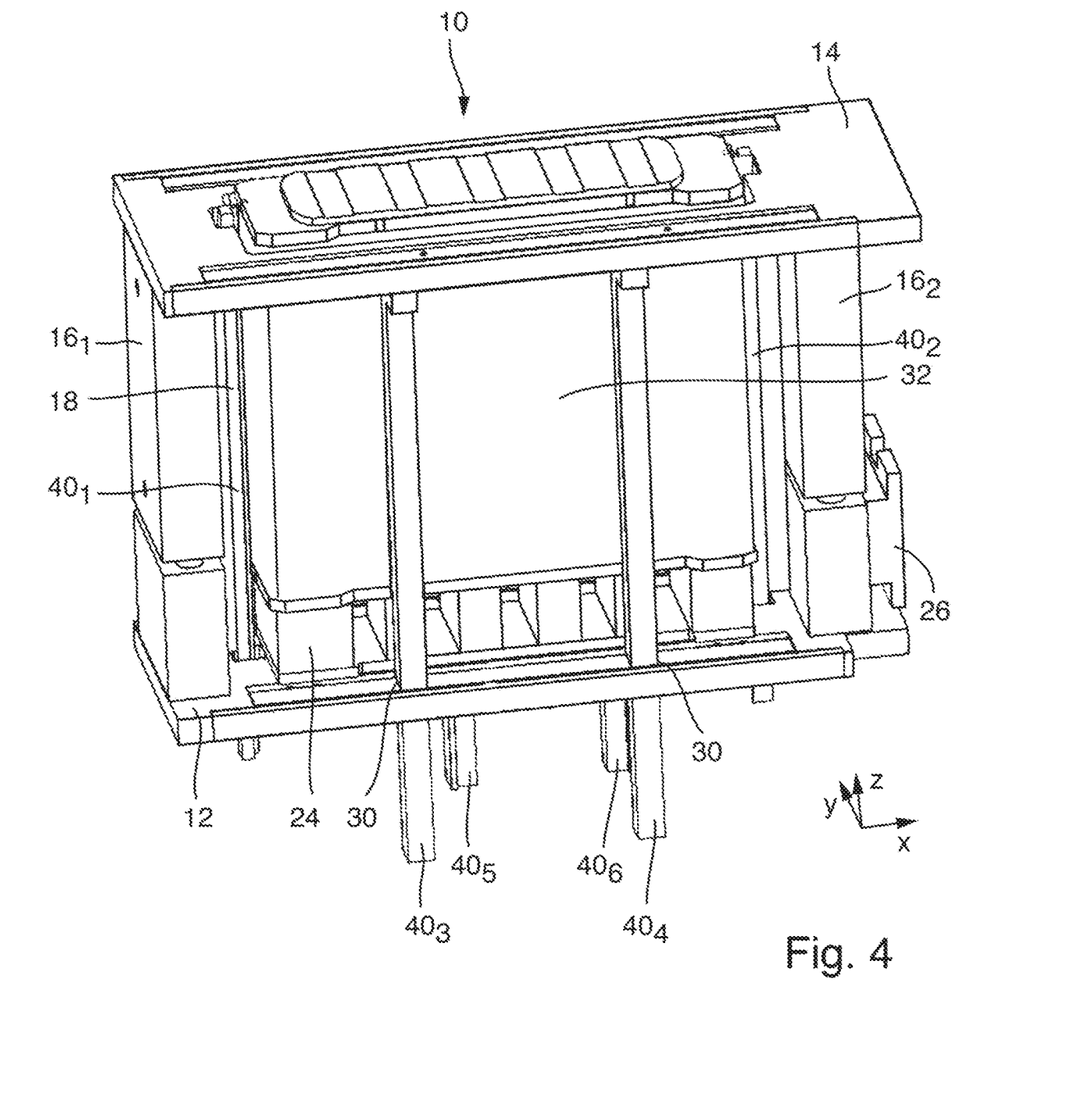
FIG. 4 is a perspective view of another example assembly device.

FIG. 4 shows a further configuration of the assembly device 10, in which the connecting pieces $16_1$, $16_2$ are divided in two horizontally, wherein the respective upper part is telescopable relative to the respective lower part. Furthermore, a finished, pressed fuel cell stack 32 is accommodated in the assembly device. This telescopic arrangement allows the function of the mobile upper strip portions 44 to be reproduced, such that these are not needed here. This simplifies access for the fitting of further elements after pressing. In this case, it is possible to dispense with the height-adjustability of the component receptacle 24. To enable relative motion between the locating strips $40_1$ to $40_6$ and the base plate 12 or the cover plate 14, the locating strips $40_1$ to $40_6$ may for example be passed through the base plate 12 through openings 30.

The assembly device 10 may be conveyed from one station to the next using a robot or a conventional transport system. For transport using a robot, the contact plate 26 is provided. The robot is provided with a downholder for stabilizing the fuel cell stack (stack) seated in the assembly device 10. To convey the assembly device 10 using a transport system, a separate workpiece holder may be used. Here too, a downholder has to be provided to stabilize the fuel cell stack (stack) seated in the assembly device 10. If no separate workpiece holder is provided, the assembly aid may also be conveyed directly on a transport system. For this purpose, appropriate elements on the assembly device (runners and the like) must be provided for the transport system. For manual transport, appropriate slinging points may be provided on the assembly device.

During pressing, a pressing tool comes into contact with the cover plate 14 of the assembly device 10 and presses the finished, stacked fuel cell stack vertically to the final dimension. In this case, the locating strips $40_1$ to $40_6$, which remain in contact with the BPP and MEA layers throughout the pressing operation, ensure that the BPP and MEA layers remain securely positioned. In this case, the stroke of the upper strip portions 44 corresponds to the pressing stroke. During the pressing operation the BPP and MEA layers may slide vertically along the locating strips $40_1$ to $40_6$ and relative to the lower strip portions 42. Since the cover plate 14 of the fuel cell stack is circumferentially larger than the BPP and MEA layers and no assembly grooves are provided, the cover plate 14 comes to lie on the upper edge of the locating strips $40_1$ to $40_6$. Since this is displaceable, the upper strip portion may move downwards without losing the guidance of the BPP and MEA layers. After the pressing operation, the position is maintained by the press and the insulation may be fitted around the BPP and MEA layers. The tension elements and any further components are then fitted. The assembly device 10 according to the invention provides sufficient space for both operations.

Figure 5:
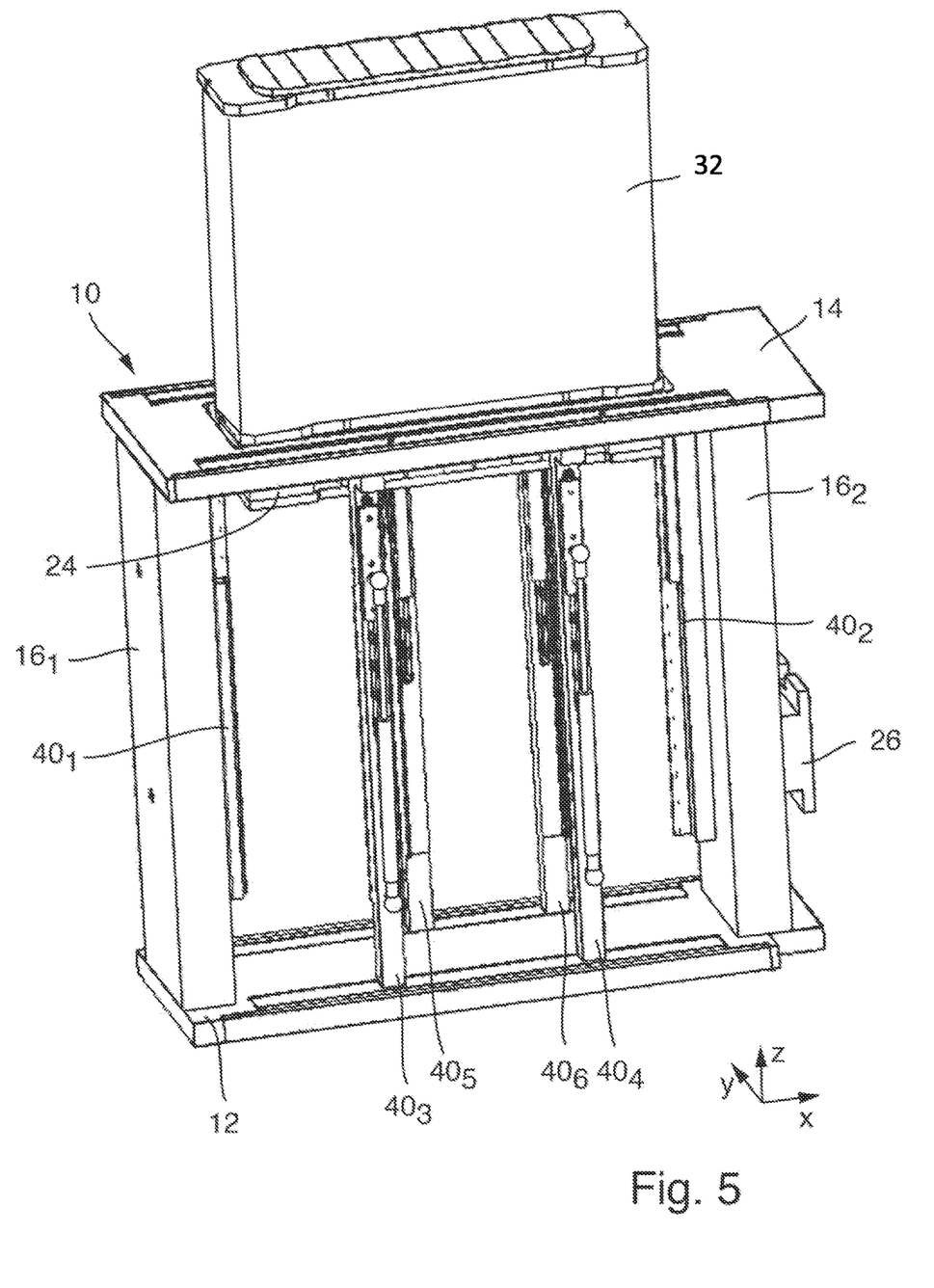
FIG. 5 is a perspective view of the assembly device according to FIG. 1 with a fuel cell stack in a removal position.

Once the tension elements have been fitted, the assembly device 10 with the finished fuel cell stack is removed from the press. Removal may proceed using the contact plate 26 for the robot or using separate slinging points. To remove the fuel cell stack from the assembly device 10, the locating strips $40_1$ to $40_6$ are moved back and the component receptacle 24 is raised into the removal position by means of an external lifting unit, as shown in FIG. 5.

LIST OF REFERENCE NUMERALS

10 Assembly device
12 Base plate

14 Cover plate
16 Connecting piece
18 Assembly chamber
20 Drive
22 Transmission mechanisms
24 Component receptacle
26 Contact plate
28 Slide rails
30 Opening
32 Fuel cell stack
40 Locating strips
42 Strip portion
44 Strip portion
46 Spring means

What is claimed is:

1. An assembly device for vertically stacking a fuel cell stack having alternating membrane-electrode units and bipolar plates, the assembly device comprising:
    a base plate with a first end face and a second end face;
    a cover plate with a first end face and a second end face;
    a first connecting piece connecting the first end face of the base plate with the first end face of the cover plate;
    a second connecting piece connecting the second end face of the base plate with the second end face of the cover plate; and
    locating strips that are oriented vertically between the base plate and the cover plate, wherein the locating strips are horizontally adjustable and define a substantially-cuboidal assembly chamber for positioning the membrane-electrode units and the bipolar plates relative to one another during stacking.

2. The assembly device of claim 1 comprising a drive for synchronous displacement of the locating strips.

3. The assembly device of claim 2 wherein the drive comprises transmission mechanisms disposed in the first and second connecting pieces, the base plate, and the cover plate for transmission to the locating strips.

4. The assembly device of claim 2 wherein the drive includes an interface via which mechanical, electrical, hydraulic or pneumatic drive energy may be introduced.

5. The assembly device of claim 1 wherein each of the locating strips comprises a vertically stationary first strip portion and a vertically mobile second strip portion.

6. The assembly device of claim 5 wherein the vertically mobile second strip portions are disposed in upper regions of the locating strips.

7. The assembly device of claim 5 wherein the vertically mobile second strip portions are positioned in vertically upper home positions relative to the vertically stationary first strip portions via spring means.

8. The assembly device of claim 1 wherein the locating strips are disposed on the first and second connecting pieces so as to extend between the base plate and the cover plate.

9. The assembly device of claim 8 wherein a first of the locating strips is disposed on the first connecting piece, wherein a second of the locating strips is disposed on the second connecting piece, wherein a third and a fourth of the locating strips are disposed between the base plate and the cover plate on flanks of the assembly device connecting the first and second connecting pieces.

10. The assembly device of claim 1 comprising a vertically adjustable component receptacle for receiving the fuel cell stack, wherein the vertically adjustable component receptacle is disposed on the base plate.

11. The assembly device of claim 1 comprising a contact plate that is configured to be connected to a manipulator for transporting the assembly device.

12. The assembly device of claim 1 comprising a contact plate that is configured to be connected to a robot for transporting the base plate, the cover plate, the first and second connecting pieces, and the locating strips.

* * * * *